(12) United States Patent
Ooma et al.

(10) Patent No.: US 6,797,424 B2
(45) Date of Patent: Sep. 28, 2004

(54) SEPARATOR FOR FUEL CELL, PRODUCTION PROCESS THEREOF, AND SOLID POLYMER FUEL CELL USING THE SEPARATOR

(75) Inventors: Atsushi Ooma, Yokohama (JP); Yasuji Ogami, Yokohama (JP); Michio Hori, Yokohama (JP); Masanori Kobayashi, Iwaki (JP); You Ootani, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/396,487

(22) Filed: Mar. 26, 2003

(65) Prior Publication Data

US 2003/0162079 A1 Aug. 28, 2003

Related U.S. Application Data

(63) Continuation of application No. PCT/JP01/00593, filed on Sep. 28, 2001.

(30) Foreign Application Priority Data

Sep. 29, 2000 (JP) .......................... 2000-301469

(51) Int. Cl.[7] .............................. H01M 2/16; H01M 2/18
(52) U.S. Cl. ............................ 429/34; 429/38; 429/39; 427/115; 427/122; 254/172
(58) Field of Search ............................ 429/34, 38, 39; 427/115, 122; 254/172

(56) References Cited

U.S. PATENT DOCUMENTS 5,300,370 A   4/1994   Washington et al.

FOREIGN PATENT DOCUMENTS

| JP | 62-272465 | 11/1987 |
|----|-----------|---------|
| JP | 9-274926  | 10/1997 |
| JP | 9-283157  | 10/1997 |
| JP | 2000-12048 | 1/2000 |

OTHER PUBLICATIONS

Abstract of JP 62272465.*
Abstract of JP 09274926.*
Abstract of JP 09283157.*
Abstract of JP 2000012048.*

* cited by examiner

*Primary Examiner*—Hoa Van Le
(74) *Attorney, Agent, or Firm*—Oblon, Spivak, McClelland, Maier & Neustadt, P.C.

(57) ABSTRACT

A solid polymer fuel cell having a structure in which a film electrode composite having gas diffusion electrodes disposed on both surfaces of a solid polymer film and separators having gas channels to feed at least either a fuel gas or an oxidant gas to the electrodes are laminated repeatedly in such a manner that they contact each other, wherein the separators each comprise a carbon resin composite material and an expansion graphite layer, on at least one surface of the material, pits and projections to form the gas channels are formed, and the layer is formed on the surfaces of the material including the pits and the projections.

7 Claims, 8 Drawing Sheets

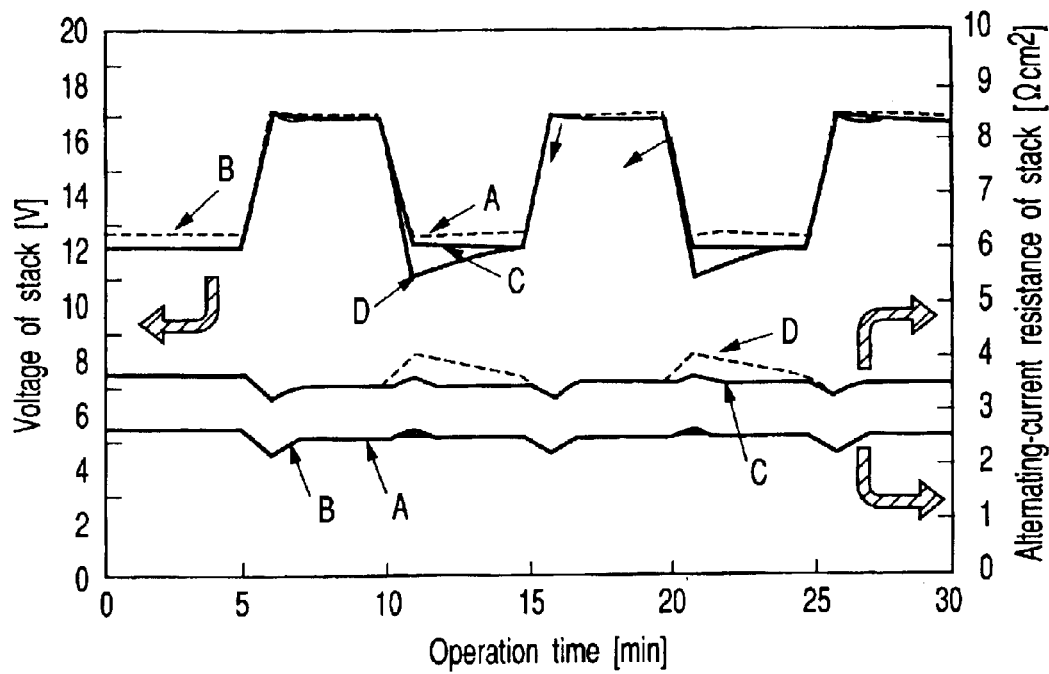
F I G. 5
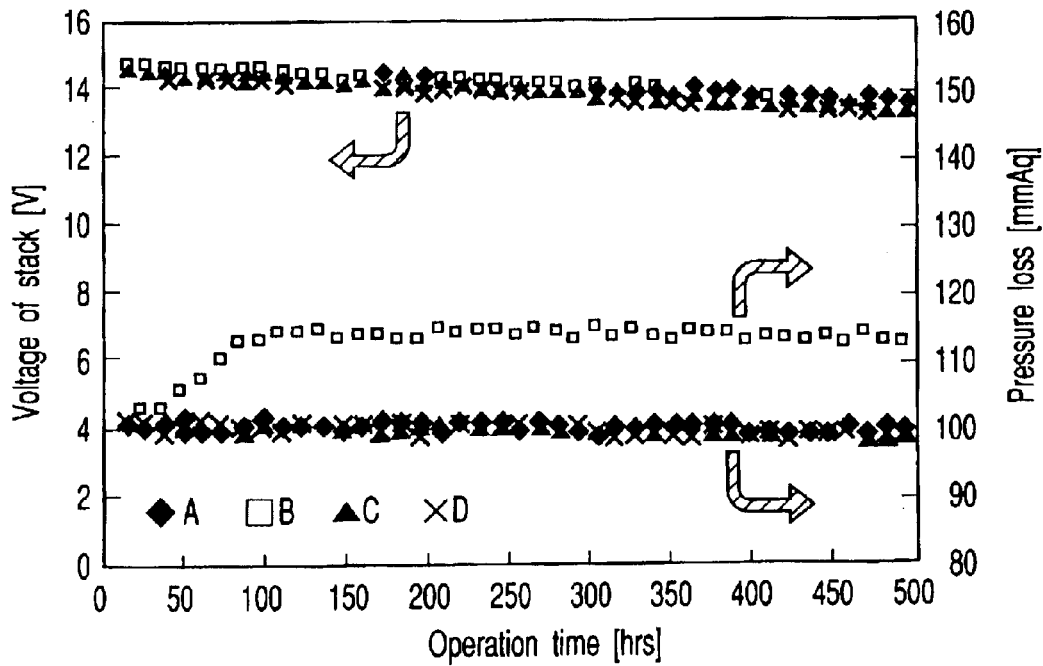
F I G. 6

SEPARATOR FOR FUEL CELL, PRODUCTION PROCESS THEREOF, AND SOLID POLYMER FUEL CELL USING THE SEPARATOR

CROSS-REFERENCE TO RELATED APPLICATIONS

This is a Continuation Application of PCT Application No. PCT/JP01/08593, filed Sep. 28, 2001, which was not published under PCT Article 21(2) in English.

This application is based upon and claims the benefit of priority from the prior Japanese Patent Application No. 2000-301469, filed Sep. 29, 2000, the entire contents of which are incorporated herein by reference.

BACKGROUND OF THE INVENTION

1. Field of the Invention

The present invention relates to a separator for a fuel cell (stack) which is used in a fuel cell, a production process thereof, and a solid polymer fuel cell using the separator for a fuel cell (stack) and comprising a solid polymer with ionic conductivity as an electrolyte.

2. Description of the Related Art

Hereinafter, prior art regarding a solid polymer fuel cell will be described with reference to FIGS. 12 and 13. FIG. 12 is a cross-sectional diagram showing a unit cell of a conventional solid polymer fuel cell, and FIG. 13 is a cross-sectional diagram showing a conventional solid polymer fuel cell stack.

In the fuel cell stack, a number of unit cells 26 shown in a schematic diagram 2 are laminated vertically. Each unit cell 26 comprises a film electrode composite 23 comprising a flat solid polymer film 21 and a flat fuel electrode 22a and an oxidant electrode 22b which are disposed on the opposing surfaces of the solid polymer film 21 so as to form a gas diffusion electrode 22; two separators 24 which are in direct contact with the fuel electrode 22a and the oxidant electrode 22b, respectively; and packing materials 25.

To extract an electric current from the film electrode composite 23, a fuel gas and an oxidant gas which are reaction gases must be fed to the electrodes 22a and 22b, respectively. Further, at the same time, components having a function of a current collector must be present in contact the electrodes 22a and 22b. These components which feed these reaction gases to the respective electrodes 22a and 22b without mixing the reaction gases together and have a function of a current collector are referred to as separators 24.

As the solid polymer film 21, a perfluorocarbonsulfonic acid film or the like is used. Since the solid polymer film 21 also serves to prevent mixing of the reaction gases to be fed to the fuel electrode 22a and the oxidant electrode 22b, its area is generally larger than the area of the electrode.

The separator 24 is preferably made of a material which hardly allows the two types of reaction gases to pass therethrough so as to prevent mixing of the reaction gases. Further, since conductivity is required, a material such as metal or carbon is used. A separator 24 on the fuel electrode 22a constitutes a front surface of a unit fuel and another separator 24 on the oxidant electrode 22b constitutes a rear surface of the unit fuel. The separators 24 and packing materials 25 for sealing the reaction gases are disposed so as to form a unit cell 26. The packing material 25 is also provided so as to prevent mixing of the two types of reaction gases and leakage of the reaction gases to the outside. When such a phenomenon as mixing of the two types of reaction gases and leakage of the reaction gases to the outside occurs, stable electric power generation with high efficiency cannot be achieved.

The unit cell 26 comprises the film electrode composite 23, the two separators 24 which are in contact with the fuel electrode 22a and the oxidant electrode 22b, and the packing materials 25.

In the separator 24, a plurality of breakthroughs each referred to as a manifold 27 for feeding the reaction gases to each unit cell and a number of fuel gas channels 28a and oxidant gas channels 28b which connect the breakthroughs with one another are formed. Thereby, gas channels 28 for feeding the fuel gas and the oxidant gas which are required for a cell reaction to the fuel electrode 22a and the oxidant electrode 22b are formed.

Since an electromotive force obtained in the unit cell 26 is as small as 1 V or less, a plurality of unit cells 26 are laminated together and electrically connected to each other in series so as to constitute a fuel cell stack 29, thereby increasing the electro-motive force. In the stack 29, a cooling plate for cooling the cell is generally provided for each unit cell 26 or each group of unit cells 26. The cooling plates are not shown in the drawings.

After a required number of unit cells 26 are laminated to form the stack 29, they are clamped in the lamination direction by means of such a clamping mechanism as clamping plates, clamping rods, springs, nuts or the like. This is done to secure electrical and thermal contacts and sealability in between the unit cells 26.

Meanwhile, to cause the solid polymer fuel cell to generate electric power, water must also be fed to the solid polymer film 21, in addition to feeding of the reaction gases to the electrodes 22a and 22b. This is because the ion conductivity of the solid polymer film 21 is significantly improved when it absorbs water. Conversely, if water is not fed to the solid polymer film 21, stable electric power generation cannot be achieved.

In a conventional solid polymer fuel cell, the ionic conductivity of a solid polymer film, i.e., the performance of the cell is very sensitive to changes in the flow rates, temperatures and humidities of reaction gasses. Hence, for example, when an abrupt load change occurs, a time lag is produced until the reaction gases settle at a temperature and humidity corresponding to the load, so that the performance of the fuel cell is liable to change and unstable during the time lag. Consequently, to keep the performance of the fuel cell constantly stable, a function to cause the fuel cell to adapt to such an environmental change must be provided in the fuel cell or in a system to cause the fuel cell to generate electric power.

As a method of providing such a function in particular into the body of the solid polymer fuel cell, an invention that separators are made of an expansion graphite having high water absorbability is disclosed in U.S. Pat. No. 5,300,370.

However, the invention has the following problems. That is, on one hand, the separator made of the expansion graphite is water-absorbable and hydrophilic, so that it has such advantages as having excellent dischargeability of water remaining in channels, being capable of conforming to an environmental change such as an abrupt load change, and having low gas permeability. On the other hand, since the expansion graphite is a relatively soft material, compression creep may occur when the solid polymer fuel cell is clamped in the lamination direction by a clamping mechanism and kept in that condition as described above, thereby causing an increase in the pressure losses of the reaction gases with time. In addition, since the film electrode composite 23 and the separator 24 are laminated repeatedly in the solid polymer fuel cell as described above, a large contact resistance between the two types of components lowers the voltage of the cell, resulting in low power generation efficiency.

To overcome the problems of the first known example described above, the following separator is disclosed in Jpn.

Pat. Appln. KOKAI Publication No. 9-274926 (second known example). The second known example is a separator in which projections that constitute gas channels formed on the surfaces of the separator are composed of a conductive elastic member.

However, when the separator of the second known example is applied to the foregoing solid polymer fuel cell of the prior art, the separator cannot conform stably to an environmental change such as an abrupt load change, since the ionic conductivity of the solid polymer film, i.e., the performance of the cell is very sensitive to changes in the flow rates, temperatures and humidities of the reaction gasses.

The present invention has been conceived to solve such problems. An object of the present invention is to provide a separator for a fuel cell, the separator being made of an expansion graphite, a production process thereof, and a solid polymer fuel cell using the separator. The separator has excellent dischargeability of water remaining in channels due to its water-absorbability and hydrophilicity, is capable of conforming stably to an environmental change such as an abrupt load change, and can be operated safely and stably for a long time with high efficiency.

BRIEF SUMMARY OF THE INVENTION

To achieve the above object, an invention according to aspect 1 is a separator for a fuel cell which has gas channels to feed a fuel gas and an oxidant gas to gas diffusion electrodes of a fuel cell, prevents mixing of the fuel gas and the oxidant gas, and has a function of a current collector, wherein the separator is obtained by press-molding a carbon resin composite material comprising a mixture of a carbonaceous material powder and a thermosetting resin powder, an expansion graphite sheet, and at least one of an electric potential measuring terminal and a temperature measuring probe, at the time of the press-molding, the carbon resin composite material has pits and projections to form the gas channels formed on at least one surface thereof, and the expansion graphite sheet is formed on the surfaces of the carbon resin composite material including the pits and the projections.

According to the invention according to aspect 1, the following effects can be obtained. That is, since a base of the separator is formed by the carbon resin composite material and the expansion graphite sheet is formed on the surfaces of the carbon resin composite material including the pits and projections to form the gas channels, merits of the expansion graphite sheet can be exploited as they are. More specifically, the surfaces of the separator conform to film electrode composites easily, and since the expansion graphite sheet is water-absorbable, the separator can conform to an environmental change such as an abrupt load change stably. Further, the separator can reduce compression creep to a greater extent than a separator comprising only an expansion graphite, and it can be operated safely and stably for a long time with high efficiency.

In addition, according to the invention according to aspect 1, since the expansion graphite sheet has low gas permeability due to a wet seal effect associated with excellent water absorbability, the weight of the separator can be reduced by reducing the density of the carbon resin composite material as the base.

According to the invention according to aspect 1, with the separator for a fuel cell which has at least either an electric potential measuring terminal or a temperature measuring probe incorporated therein, the voltage or temperature of a unit cell can be constantly monitored easily. This is useful because a solid polymer fuel cell must obtain a stable voltage in all unit cells and it is necessary to monitor the potential or temperature of a specific unit cell so as to protect the fuel cell.

BRIEF DESCRIPTION OF THE SEVERAL VIEWS OF THE DRAWING

FIG. 5 is a diagram showing the results of a load change test in the first embodiment.

FIG. 6 is a diagram showing the results of a 500-hour continuous electric power generation test in the first embodiment.

DETAILED DESCRIPTION OF THE INVENTION

The embodiments of a separator for a fuel cell according to the present invention, a production process thereof and a solid polymer fuel cell using the separator will be described with reference to the drawings.

(First Embodiment)

(Constitution)

Figure 1:
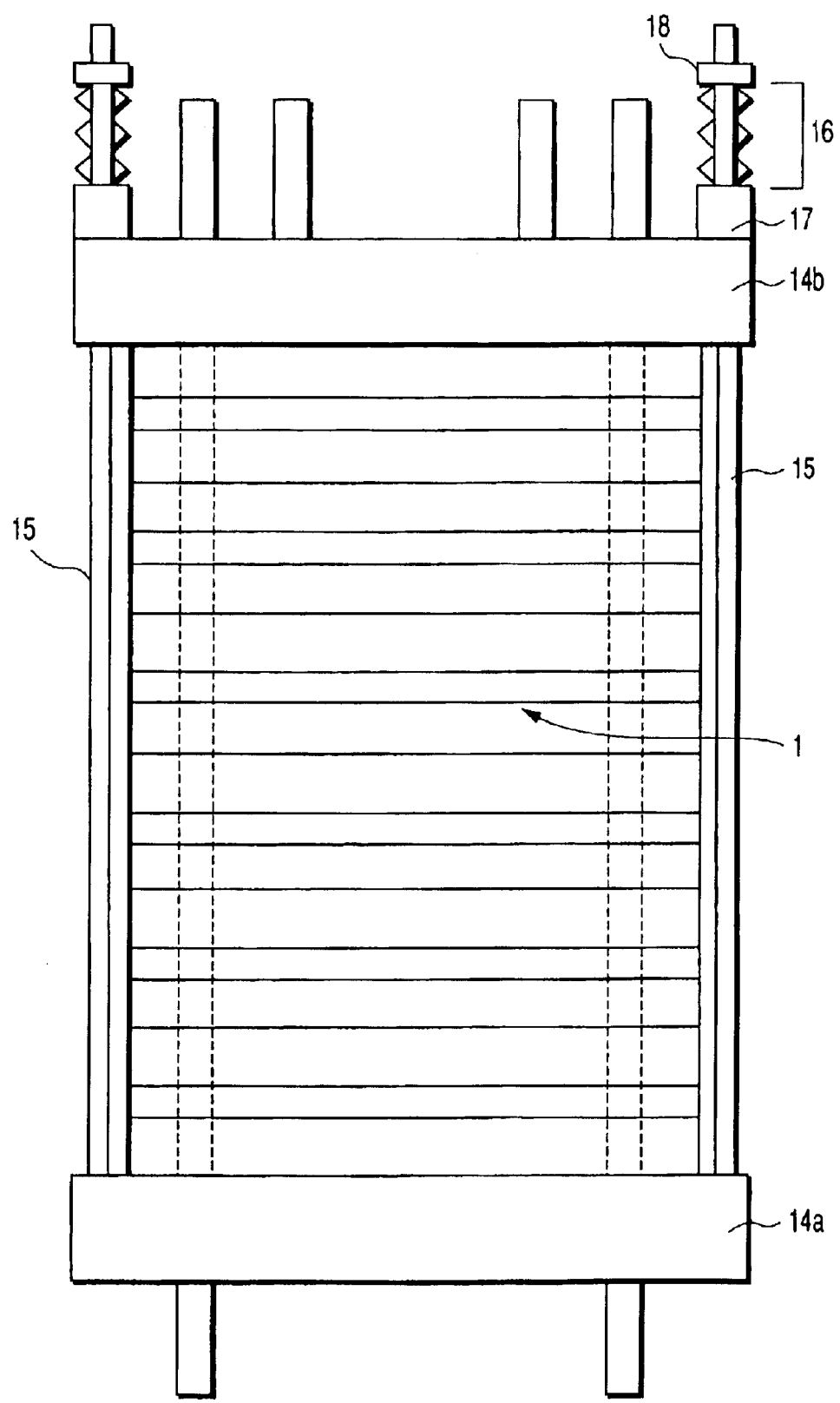
FIG. 1 is a schematic block diagram for illustrating a first embodiment of a solid polymer fuel cell of the present invention.
Figure 2:
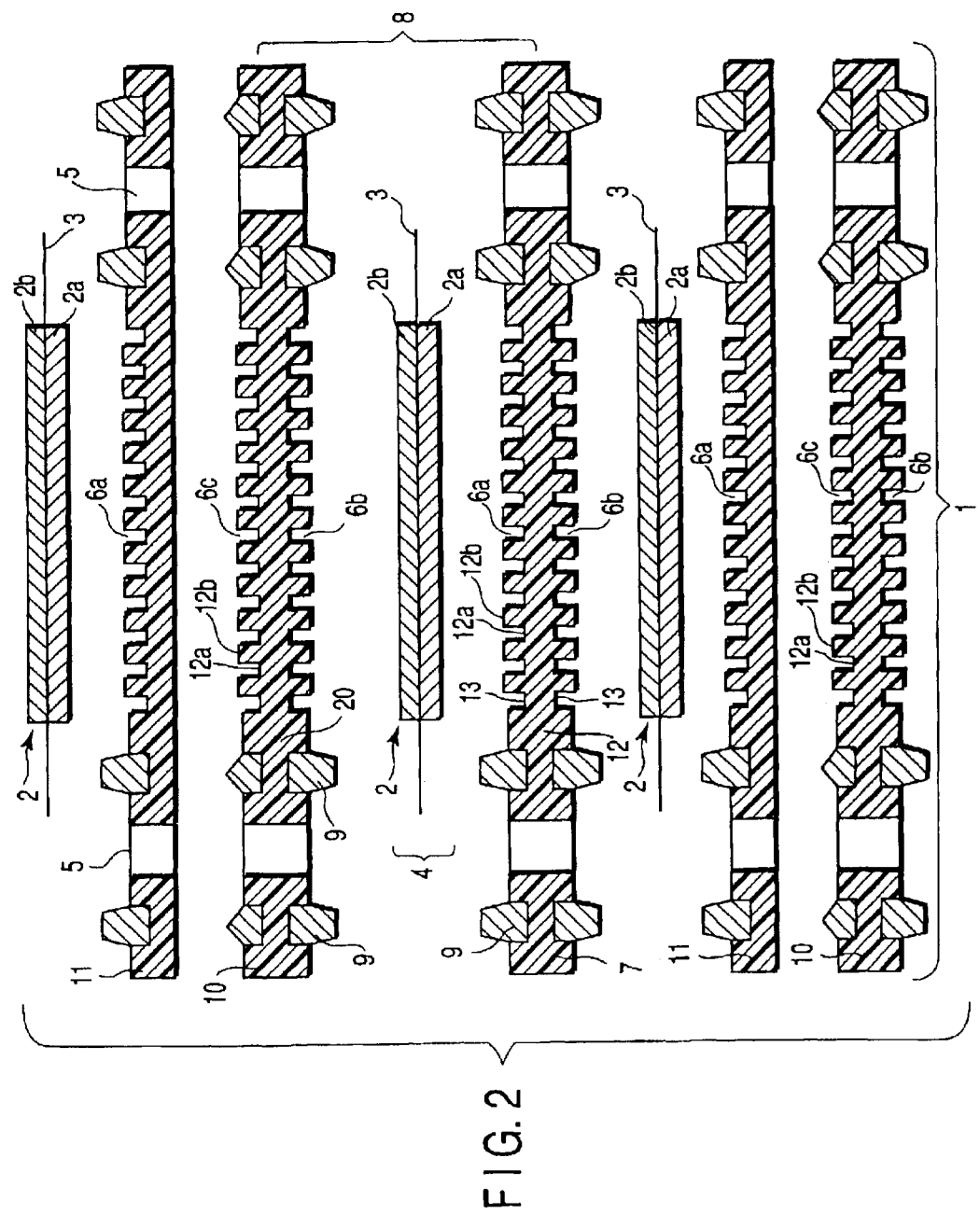
FIG. 2 is an enlarged cross-sectional diagram of the solid polymer fuel cell of FIG. 1.

The constitutions of a separator for a fuel cell and a solid polymer fuel cell in a first embodiment according to the present invention will be described with reference to FIGS. 1 to 6. The basic structure of the solid polymer fuel cell in the present embodiment is the same as that of the aforementioned prior art as shown in FIGS. 1 and 2. That is, it comprises a solid polymer fuel cell stack 1 which will be described later, clamping plates 14 for extracting an electric current (upper clamping plate 14a for extracting an electric current and lower clamping plate 14b for extracting an electric current) which are disposed on both sides of the fuel cell stack 1, and rods 15, flat countersunk head screws 16, insulation bushings 17 and nuts 18 all of which clamp both of the clamping plates 14 and the fuel cell stack 1.

The fuel cell stack 1, as shown in FIG. 2, is formed by repeatedly laminating a unit cell 8 which comprises film electrode composites 4 and separators 7 and 10 and a fuel separator 11 which will be described later, in such a manner that the laminated unit cells 8 contact with each other, the separators 7, 10 and 11 being disposed so as to sandwich the film electrode composites 4.

The film electrode composite 4 is formed by disposing a gas diffusion electrode 2 (fuel electrode 2a and oxidant electrode 2b) on each of opposing surfaces of a flat solid polymer film 3.

Figure 3:
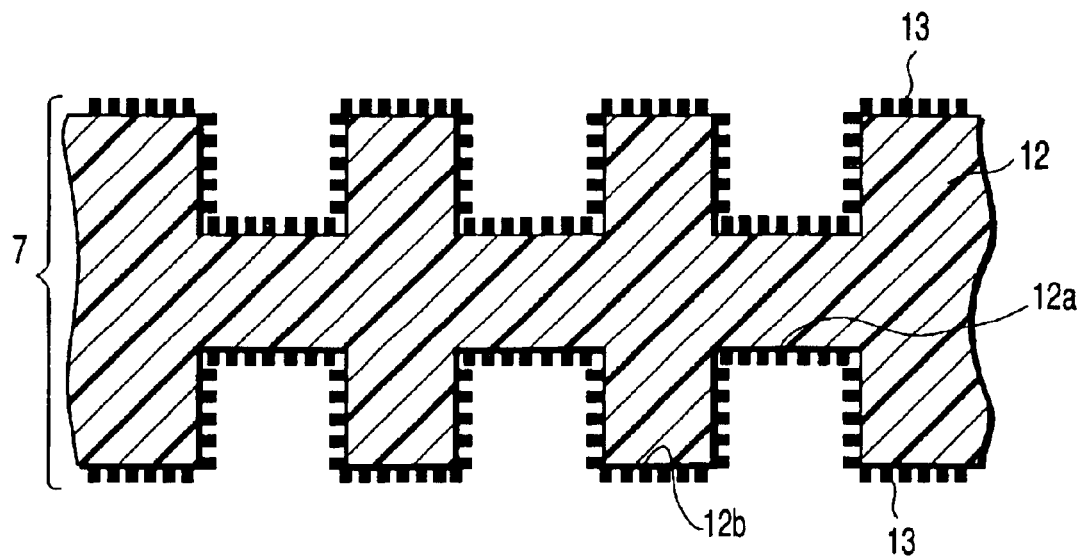
FIG. 3 is an enlarged cross-sectional diagram of a separator of FIG. 2.

The present embodiment is characterized in that the separators 7, 10 and 11 which are constituted as follows are used. That is, the separator 7 (integration of an oxidant gas separator and a fuel gas separator), as shown in FIG. 3, comprises a carbon resin composite material 12 and an expansion graphite layer 13. The carbon resin composite material 12 is a plate having pits 12a and projections 12b formed on its surfaces so as to form fuel gas channels 6a on one surface and oxidant gas channels 6b on the other surface. The expansion graphite layer 13 is formed all over the surfaces of the carbon resin composite material 12, including the pits 12a and the projections 12b.

The separator 10 (integration of an oxidant gas separator and a cooling plate) has almost the same constitution as that of the separator 7. It comprises a carbon resin composite material 12 and an expansion graphite layer 13. The carbon resin composite material 12 is a plate having pits 12a and projections 12b formed on its surfaces so as to form cooling water channels 6c on one surface and oxidant gas channels 6b on the other surface. The expansion graphite layer 13 is formed all over the surfaces of the carbon resin composite material 12, including the pits 12a and the projections 12b.

The separator 11 (integration of a fuel gas separator and a cooling plate) is disposed between the separator 10 and the film electrode composite 4. The flat carbon resin composite material 12 has pits 12a and projections 12b formed on one surface so as to form fuel gas channels 6a, and an expansion graphite layer 13 is formed all over the surface (which faces the fuel electrode 2a) including the pits 12a and the projections 12b. The other surface (which faces the cooling water channels 6c of the separator 10) of the carbon resin composite material 12 is flat with nothing formed thereon.

Hereinafter, the solid polymer fuel cell in the present embodiment will be described in detail. The fuel cell is formed by repeated lamination of a unit cell 8 which has an integrated separator 7 disposed on both surfaces of a film electrode composite 4, the composite 4 having a solid polymer film 3 sandwiched between two electrodes 2, i.e., a fuel electrode 2a and an oxidant electrode 2b, and the separator 7 having a plurality of breakthroughs each referred to as a manifold 5, fuel gas channels 6a for connecting fuel gas manifolds to each other on one surface of the separator, and oxidant gas channels 6b for connecting oxidant gas manifolds to each other on the other surface of the separator. The actual number of repetitions of the unit cell is 20, for example.

Further, between the separator 7 and the film electrode composite 4, packing materials 9 for gas sealing are provided so as to prevent mixing of reaction gases and leakage of the reaction gases to the outside. In addition, a total of 10 cooling plates are provided, one for each pair of unit cells, and cooling water flows through cooling water channels 6c. A cooling plate and an oxidant gas separator are integrated into a separator 10, and a fuel gas separator 11 is a one-surface simple plate.

A cross section of the separator 7 was observed by use of a scanning electron microscope (SEM). An enlarged view of the cross section is shown in FIG. 3. That is, the separator 7 is a composite article having a three-layer structure comprising a carbon resin composite material 12 which is a central layer serving as a base and will be described later and expansion graphite layers 13 which are formed on the surfaces of the carbon resin composite material 12 including pits 12a and projections 12b.

In this case, as the expansion graphite layer 13, an expansion graphite layer having a basis weight of 120 g/m$^2$ or a thickness of 70 $\mu$m and a density of about 1.7 g/cm$^3$ is used. Both the carbon resin composite material 12 and the expansion graphite layer 13 are molded so as to have pits and projections which correspond to gas channels.

Next, a production process of the separator 7 which is a composite article will be described. The production process of the separator 7 roughly comprises the following first to third steps. The first step is a step of obtaining a raw material powder comprising 0 to 85 wt % of a carbonaceous material and 15 to 100% of a thermosetting resin. The second step is a step of placing the raw material powder obtained in the first step evenly on an internal surface of a mold for press molding and placing an expansion graphite sheet on a portion or all of one or both surfaces of the spread powder.

The third step is a step of press-molding the raw material powder and expansion graphite sheet(s) obtained in the second step simultaneously by use of the mold for press molding and controlling the molding temperature.

Next, details of the production process will be described. As the carbonaceous material, SGO-45 (aspect ratio: 4 to 5) of SEC Co., Ltd., was sieved to have a particle size of not larger than 90 $\mu$m and then dried by heating at 120° C. for 2 hours. Further, as carbon fibers, M-207S (average fiber length: 0.4 mm) of Kureha Chemical Industry Co., Ltd., using pitch-based carbon fibers as a raw material was dried under the same conditions.

As the thermosetting resin, PG-2411 which is a phenol resin of Gunei Chemical Industry Co., Ltd., was sieved to have a particle size of not larger than 90 $\mu$m and then vacuum-dried. Thereafter, 75 wt % of the graphite powder, 5 wt % of the carbon fibers and 20 wt % of the thermosetting resin were blended in a V blender at room temperature and atmospheric pressure. The mold engraved in advance had channels formed inside, and hot water was made to flow through the channels to preheat the mold at 70° C. Then, the expansion graphite sheet was placed in a lower mold, the raw material was filled in the lower mold, KUREGRAPH which is a trade name of a product of Kureha Chemical Industry Co., Ltd., as the expansion graphite sheet was also placed on the surface of the raw material, and an upper mold was then placed on the graphite sheet.

After the mold filled with the raw material was transferred to a pressing machine so as to be pressurized at 10 MPa in terms of projection cross-sectional area, a steam of 160° C. or higher was flown through the channels in the mold so as to increase the temperature of the inside of the mold. At this time, the graphite powder and the carbon fibers are bonded together due to plasticization of the thermosetting resin, and they are cured in accordance with the engravings of the mold due to curing of the thermosetting resin.

The curing time in this case was 10 minutes at a temperature of the inside of the mold of 150° C. or higher. Thereafter, with the mold still under pressure, cooling water was flown through the channels in the mold, and when the temperature of the inside of the mold reached 100° C. or lower, the pressure was released. A molded article was removed from the mold, and unnecessary portions of the molded article were cut off so as to obtain a separator.

A solid polymer fuel cell A using such composite separators and standard film electrode composites was clamped in the lamination direction by upper and lower clamping plates 14a and 14b for extracting an electric current, rods 15, flat countersunk head screws 16, insulation bushings 17, nuts 18, and the like as shown in FIG. 1, and humidified reaction gases and cooling water were fed into the cell A so as to carry out electric power generation tests.

As comparative examples, three solid polymer fuel cells (number of unit cells: 20) were further prepared in the same manner as the cell A except that the raw materials of the separator were changed. A first cell is a solid polymer fuel cell B comprising separators made of only the expansion graphite layer 13, a second cell is a solid polymer fuel cell C comprising separators made of only the carbon resin composite material 12 which constitutes the base of the composite separator, and a third cell is a solid polymer fuel cell D comprising separators made of only a carbon resin composite material having the same level of gas permeability as that of the expansion graphite 13. The separator in the cell D has a higher specific gravity than that in the cell A or C and lower gas permeability than that in the cell C.

Electric power generation tests were conducted on these four solid polymer fuel cells, and the results of the tests were compared and evaluated. As the electric power generation tests for the four solid polymer fuel cells, a current density-voltage property test (i-V property test), an alternating-current resistance measuring test, a load change test, a 500-hour continuous electric power generation test, and monitoring of pressure loss of an oxidant gas were carried out.

(Results of Experiments and Effects)

Figure 4:
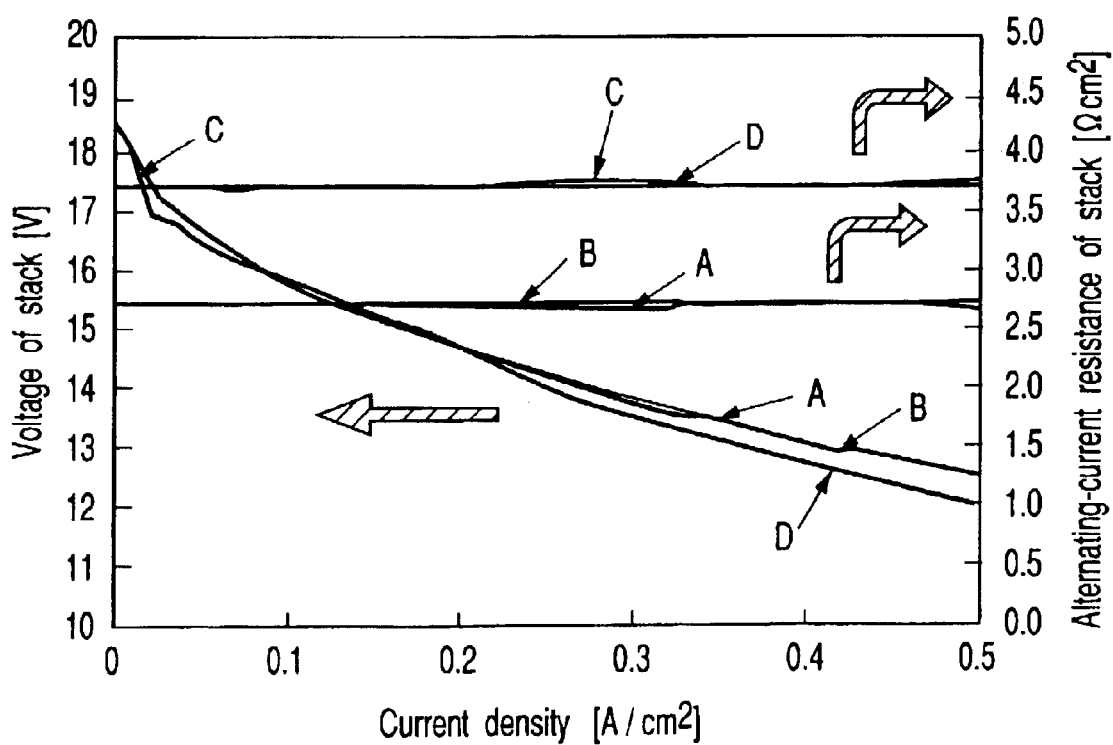
FIG. 4 is a diagram showing the results of an i-V property test and an alternating-current resistance measuring test in the first embodiment.
Figure 7:
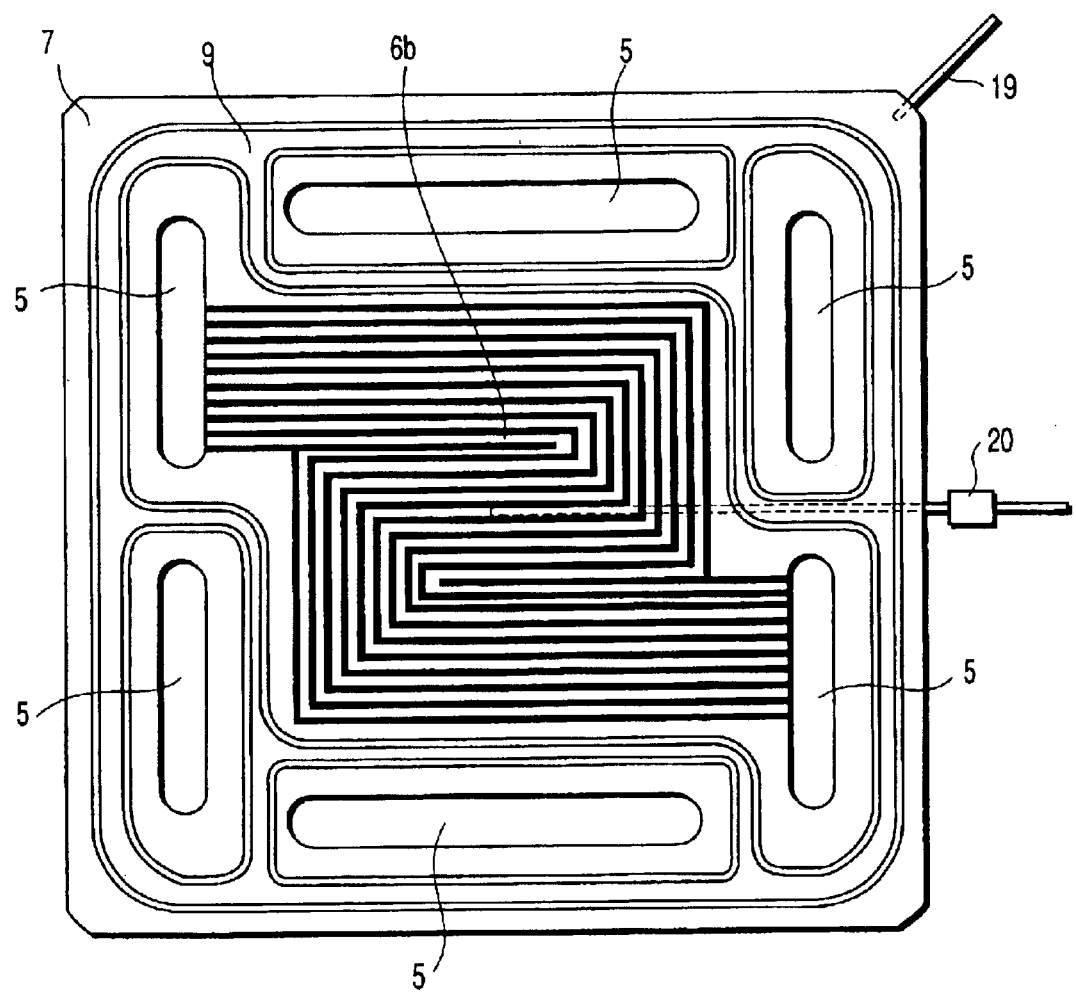
FIG. 7 is a plan view of a separator for illustrating a third embodiment of the solid polymer fuel cell of the present invention.

The results of the i [current density ($A/cm^2$)]–V [stack voltage (V)] property test and the alternating-current resistance measuring test are shown in FIG. 4. For the solid polymer fuel cells A and B, similar i-V properties were obtained, whereas for the solid polymer fuel cells C and D, inclinations of i-V curves were larger than those for the fuel cells A and B. Further, for the solid polymer fuel cell C, an open circuit voltage (OCV, under no load) and values of voltages in the vicinity of the open circuit voltage were low. In addition, as a result of measurements of current densities and alternating-current resistances, the fuel cells C and D showed higher results than the fuel cells A and B.

This is because the fuel cells C and D have high contact resistances, particularly high electric contact resistances. Meanwhile, the fuel cell A had the same alternating-current resistance value as that of the fuel cell B adopting the separators made of only the expansion graphite 13, and with a structure in which an expansion graphite layer 13 having a thickness of 70 $\mu$m was formed on the surface of the carbon resin composite material 12, the contact resistance of the fuel cell A could be lowered to the same contact resistance as that of the fuel cell B. Further, the reason why the voltage of the fuel cell C drops under a low load is because so-called crossover occurs which is mixing of fuel gas with oxidant gas through the highly gas permeable carbon resin composite material 12 used as a base of the composite separator.

Next, the results of the load change test are shown in FIG. 5. A load (current density) change sequence was "0.05 $A/cm^2 \rightarrow 0.5$ $A/cm^2 \rightarrow 0.05$ $A/cm^2 \rightarrow 0.5$ $A/cm^2$", retention time with respect to each load was 5 minutes, and a load change operation was done within 10 seconds. Further, during the period, gas utilization factors and the temperature of cooling water were kept constant. As a result of determining trends of voltage and alternating-current resistance under each load, the fuel cells A and B showed similar trends, and the fuel cell C showed a similar trend to those of the fuel cells A and B although its voltage was slightly low for the above reason. The fuel cell D showed a decrease in voltage and an increase in alternating-current resistance immediately after an increase in load, as compared with other fuel cells.

These trends are explained as follows. That is, along with an increase in load, the flow rates of the reaction gases (the flow rate of the oxidant gas in particular) increase sharply, and the cells are shifted to the condition in which the amount of evaporation increases. As for the fuel cell D, it is deficient in water to evaporate, and water in the solid polymer film 3 evaporates. Hence, its alternating-current resistance value becomes high. As for the fuel cells A, B and C, on the other hand, since evaporatable water sufficient to conform to changes in load is contained in the separator material forming the gas channels 6a and 6b, their voltages are stable, and their alternating-current resistances hardly change.

Next, the results of the 500-hour continuous electric power generation test and the trends of pressure loss of the oxidant gas are shown in FIG. 6. A current density was fixed at 0.2 $A/cm^2$, and gas utilization factors and the temperature of cooling water were kept constant. As for a change in voltage, the voltages of all cells showed stable trends. As for a change in the pressure loss of the oxidant gas, an increase in the pressure loss could hardly be observed over 500 hours for the fuel cells A, C and D. On the other hand, for the fuel cell B, a moderate increase in the pressure loss was observed in the first 100 hours or so, and the pressure loss remained almost the same thereafter.

As for the fuel cell B, since the separator 7 is formed from only the expansion graphite 13, the compression creep per separator is so large that the increase in the pressure loss was observed in the first 100 hours or so. However, once the compression creep reached saturation, the pressure loss remained constant.

Although the above-described-production process was described with respect to the separator 7, it can also be applied to the separator 10 or 11.

(Effects)

According to the first embodiment described above, the following effects can be attained.

(1) The separators 7, 10 and 11 each comprise a carbon resin composite material 12 and an expansion graphite layer 13, the carbon resin composite material 12 is a plate having pits 12a and projections 12b formed on its surfaces so as to form gas channels thereon, and the expansion graphite layer 13 is formed on the surfaces of the carbon resin composite material 12 including the pits 12a and the projections 12b. Thereby, increases in the pressure losses of reaction gases are suppressed, and a light, high-performance solid polymer fuel cell which can be operated safely and stably over a long time can be obtained.

(2) Since the expansion graphite layer 13 with high water absorbability absorbs moisture in the reaction gases, it serves as a moisture buffer, and a solid polymer fuel cell which retains stable properties even at the time of load change can be obtained.

(3) By forming the expansion graphite layer 13 on a portion of or all over at least one surface of the carbon resin composite material 12 and integrating them by press-molding, a solid polymer fuel cell which can achieve a power saving and can be operated stably over a long time can be obtained. A high-performance solid polymer fuel cell which can achieve reductions in the contact resistance and gas permeability of a separator and is light and stable can be obtained.

(Second Embodiment)

(Constitution)

Separators a, b, c and d which had the same constitution and form as those of the separator 7 in FIG. 3 and comprised carbon resin composite materials 12 having different compositions from that of the carbon resin composite material 12 which constituted as a central base of the separator 7 were prepared. Production processes of the separators a, b, c and d are basically the same as that described in the first embodiment. As for the mixing ratio of a carbonaceous material and a thermosetting resin in the products, the separator a comprised 0 wt % of a carbonaceous material and 100 wt % of a thermosetting resin, the separator b comprised 50 wt % of a carbonaceous material and 50 wt % of a thermosetting resin, the separator c comprised 85 wt % of a carbonaceous material and 15 wt % of a thermosetting resin, and the separator d comprised 90 wt % of a carbonaceous material and 10 wt % of a thermosetting resin. As for the mixing ratio of graphite powder and carbonaceous fibers in the carbonaceous material, it comprised 75 wt % of graphite powder and 25 wt % of carbonaceous fibers. Firstly, the weights of the separators a, b, c and d were compared with one another. Then, these separators were subjected to a 1,000-hour continuous heating test at 80° C. by use of a heatable glass vessel filled with ultrapure water so as to test removability of the expansion graphite layer 13 from the carbon resin composite material 12. Further, after the continuous heating test, the separators were dried at 120° C. for 2 hours, and helium was then applied to the separators at a pressure of 50 kPa so as to compare the amounts of helium permeated through the separators with one another by use of a device for measuring the amount of permeated gas.

(Results of Experiments and Effects)

Firstly, when the weights of the separators a, b, c and d were compared with one another, their weights increased in alphabetical order.

Then, in the 1,000-hour continuous heating test carried out at 80° C., no peeling of the expansion graphite layer 13 occurred for the separators a, b and c, while partial peeling of the expansion graphite layer 13 was seen for the separator d. Further, in the subsequent drying at 120° C., swellings and ruptures occurred due to evaporation of water in the expansion graphite layer for the separator d.

Further, as a result of measuring the amounts of helium permeated through the separators by means of the device for measuring the amount of permeated gas, the amount was $10^{-3}$ ml/sec/cm$^2$ for the separators a, b and c, while the amount was 10 ml/sec/cm$^2$ for the separator d, indicating that more helium permeated through the separator d than the separators a, b and c.

(Effects)

By use of a raw material comprising 0 to 85% of a carbonaceous material and 15 to 100% of a thermosetting resin as a carbon resin composite material of a separator, the weight of a solid polymer fuel cell can be reduced. Further, an effect of binding the carbon resin composite material to an expansion graphite layer is imparted, so that during long-term power generation of the solid polymer fuel cell, stable power generation is possible without having peeling of the expansion graphite layer in the separator. In addition, a high-performance solid polymer fuel cell can be obtained by a reduction in the gas permeability of the separator.

(Third Embodiment)
(Constitution)

Four solid polymer fuel cells E, F, G and H which had the same constitutions and forms as those shown in FIGS. 2 and 3 and were different from one another only in terms of the basis weight of an expansion graphite layer 13 formed on the surfaces of a separator 7 were prepared. The production processes of the separators in the fuel cells E, F, G and H are basically the same as that described in the first embodiment. As for the basis weights of the expansion graphite layers in the products, they were 30 g/m$^2$ for the fuel cell E, 50 g/m$^2$ for the fuel cell F, 300 g/m$^2$ for the fuel cell G, and 500 g/m$^2$ for the fuel cell H. At this time, cross sections of the separators 7 were observed under the SEM. As a result, the thickness and density of the expansion graphite layer 13 in the fuel cell E were 18 μm and about 1.7 g/cm$^3$, the thickness and density of the expansion graphite layer 13 in the fuel cell F were 30 μm and about 1.7 g/cm$^3$, the thickness and density of the expansion graphite layer 13 in the fuel cell G were 180 μm and about 1.7 g/cm$^3$, and the thickness and density of the expansion graphite layer 13 in the fuel cell H were 400 μm and about 1.3 g/cm$^3$. Further, in separators 7 (No. 1 and No. 21) at both ends in the lamination direction of each fuel cell and a separator 7 (No. 11) in the middle of the cell, a copper wire 19 for measuring an electric potential was embedded in one corner diagonally, and a K-type thermocouple 20 with a sheath diameter of 0.5 mm for measuring the temperature of the central portion of the separator was embedded from the center toward one of midpoints of sides connecting four corners. An electric potential difference on each copper wire 19 was measured so as to determine half cell voltages for an upper portion (No. 1 to No. 10) and for a lower portion (No. 11 to No. 20). Each fuel cell adopts a system which protects the fuel cell by stopping electric power generation when a difference in voltage between the upper and lower half cells (halves of the stack) and the temperatures of the half cells exceed respective standard values.

Electric power generation tests were conducted on the solid polymer fuel cells E, F, G and H using these four separators. As the electric power generation tests for the four solid polymer fuel cells, a current density-voltage property test (i-V property test), an alternating-current resistance measuring test, measurement of the temperature of the central portion of the separator, a load change test, a 500-hour continuous electric power generation test, and monitoring of pressure loss of an oxidant gas were conducted. In addition, the compression creep of the expansion graphite layer and the depths of the gas channels were also studied.

(Results of Experiments and Effects)

Figure 8:
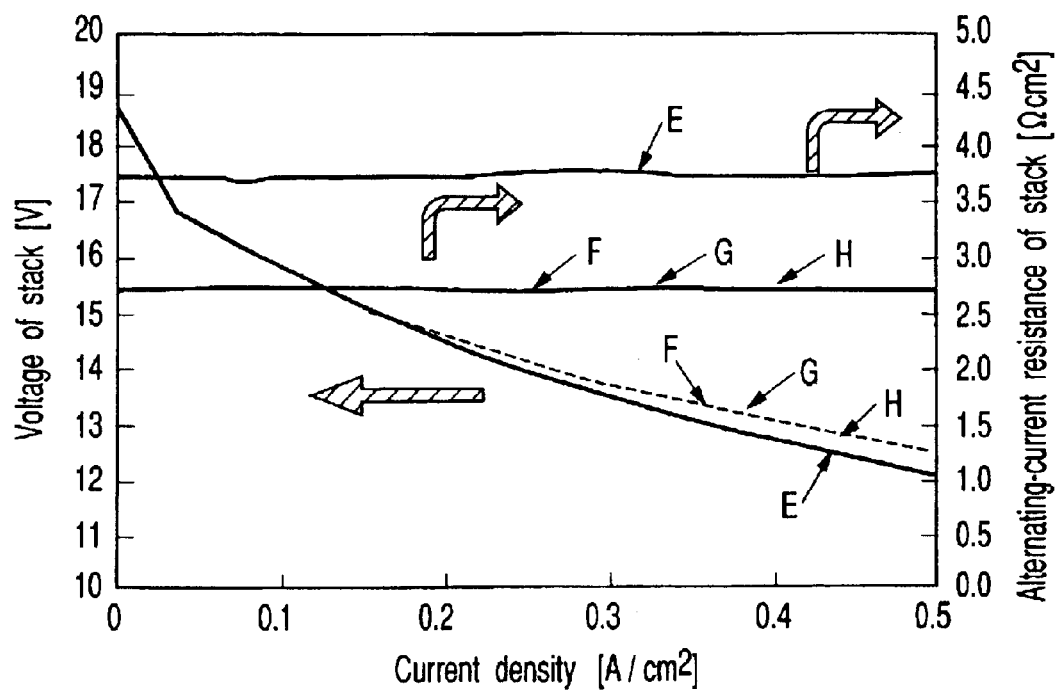
FIG. 8 is a diagram showing the results of an i-V property test and an alternating-current resistance measuring test in the third embodiment.

The results of the i-V property test and the alternating-current resistance measuring test are shown in FIG. 8. The fuel cells F, G and H showed similar results of the i-V property test and similar alternating-current resistance values. As for the fuel cell E, on the other hand, the drop in voltage became remarkable along with the increase in current density. Further, its measured alternating-current resistance values were larger than those of other fuel cells. Further, as a result of measuring the temperatures of the above three thermocouples in each of the fuel cells E, F, G and H, the temperature of the thermocouple 20 inserted into the No. 11 separator 7 at a current density of 0.5 A/cm$^2$ was 85° C. for the fuel cell E and 80° C. for the fuel cells F, G and H. Further, the difference in voltage between the half cells did not exceed the standard value in any of the fuel cells.

Figure 9:
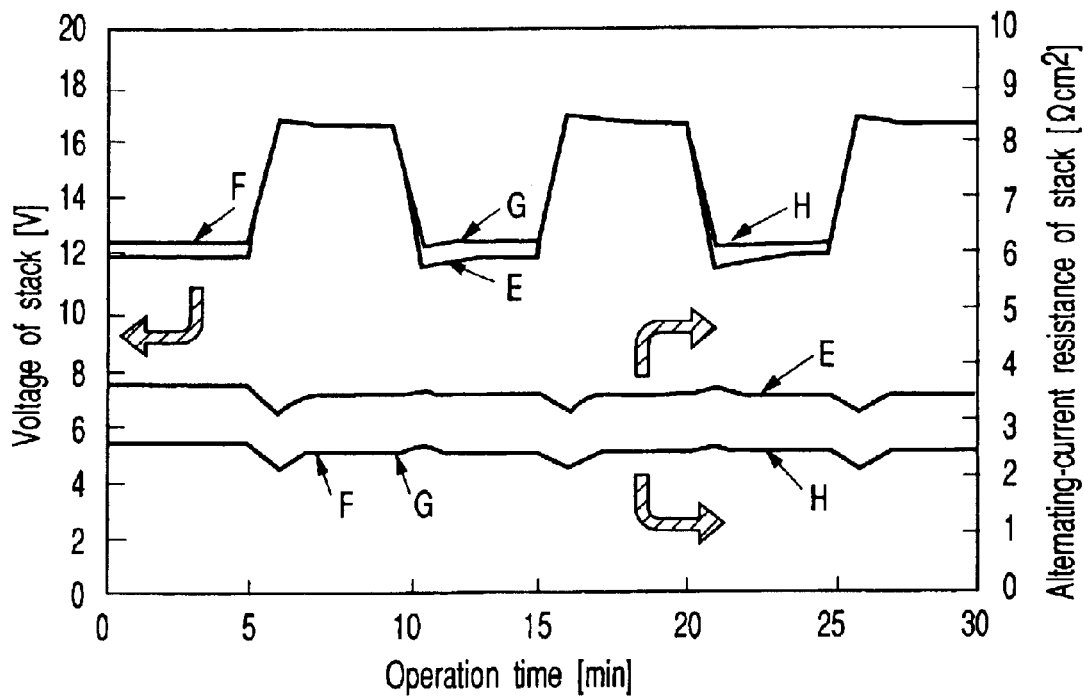
FIG. 9 is a diagram showing the results of a load change test in the third embodiment.

Next, the results of the load change test are shown in FIG. 9. A load (current density) change sequence was "0.05 A/cm$^2$→0.5 A/cm$^2$→0.05 A/cm$^2$→0.5 A/cm$^2$", retention time with respect to each load was 5 minutes, and a load change operation was done within 10 seconds. Further, during the period, gas utilization factors and the temperature of cooling water were kept constant. As a result of determining trends of voltage and alternating-current resistance under each load, the fuel cell E showed a low voltage and delayed load conformability, while the fuel cells F, G and H showed similar trends.

From these test results, it was confirmed that the expansion graphite layer 13 could not have water absorbability sufficient to reduce electric and thermal contact resistances and to secure load conformability when the expansion graphite layer 13 had a basis weight of 30 g/m$^2$ and that the effect could be attained when the expansion graphite layer 13 had a basis weight of 50 g/m$^2$ or higher.

Figure 10:
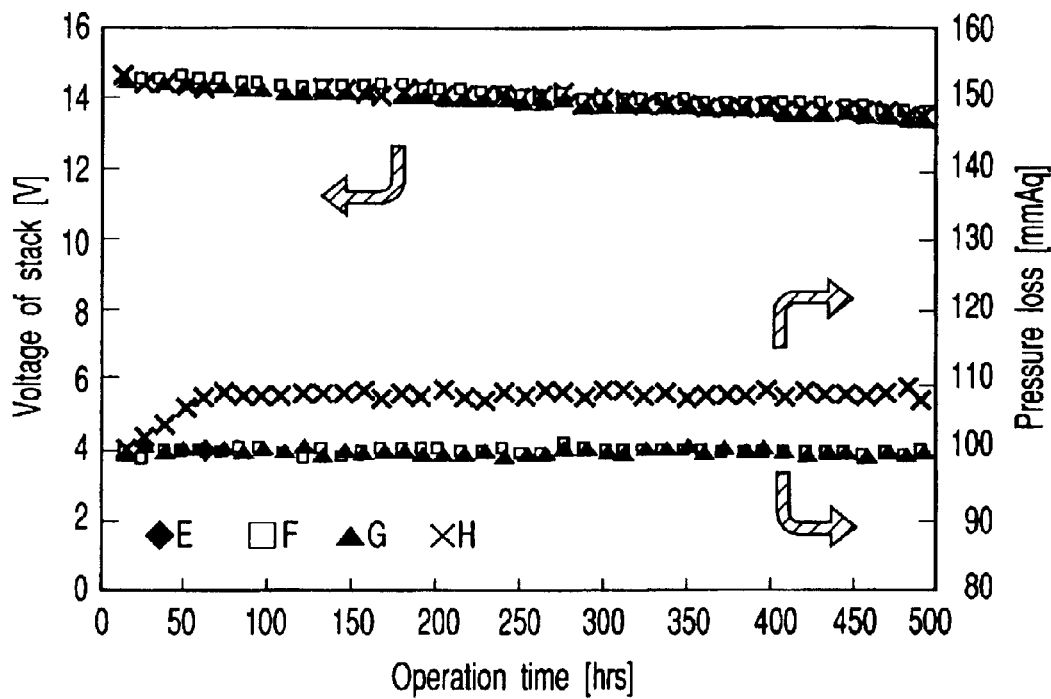
FIG. 10 is a diagram showing the results of a 500-hour continuous electric power generation test in the third embodiment.

Next, the results of the 500-hour continuous electric power generation test and the trends of pressure loss of the oxidant gas are shown in FIG. 10. A current density was fixed at 0.2 A/cm$^2$, and gas utilization factors and the temperature of cooling water were kept constant. As for a change in voltage, the voltages of all cells showed stable trends. As for a change in the pressure loss of the oxidant gas, an increase in the pressure loss could hardly be observed over 500 hours for the fuel cells E, F and G. On the other hand, for the fuel cell H, a moderate increase in the pressure loss was observed in the first 100 hours or so, and the pressure loss remained almost the same thereafter.

Figure 11:
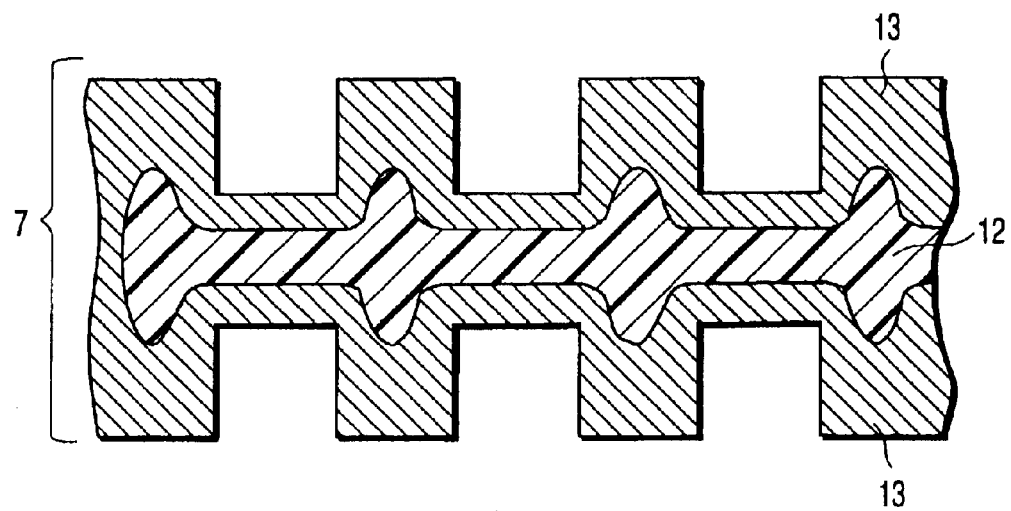
FIG. 11 is an enlarged cross-sectional diagram of a separator in a solid polymer fuel cell H of the third embodiment.
Figure 12:
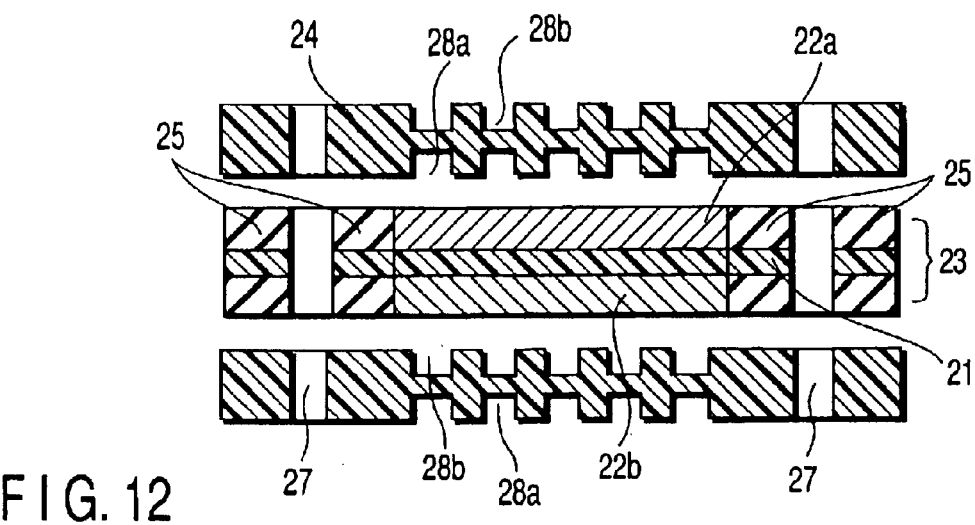
FIG. 12 is a cross-sectional diagram showing a unit cell in a conventional solid polymer fuel cell.
Figure 13:
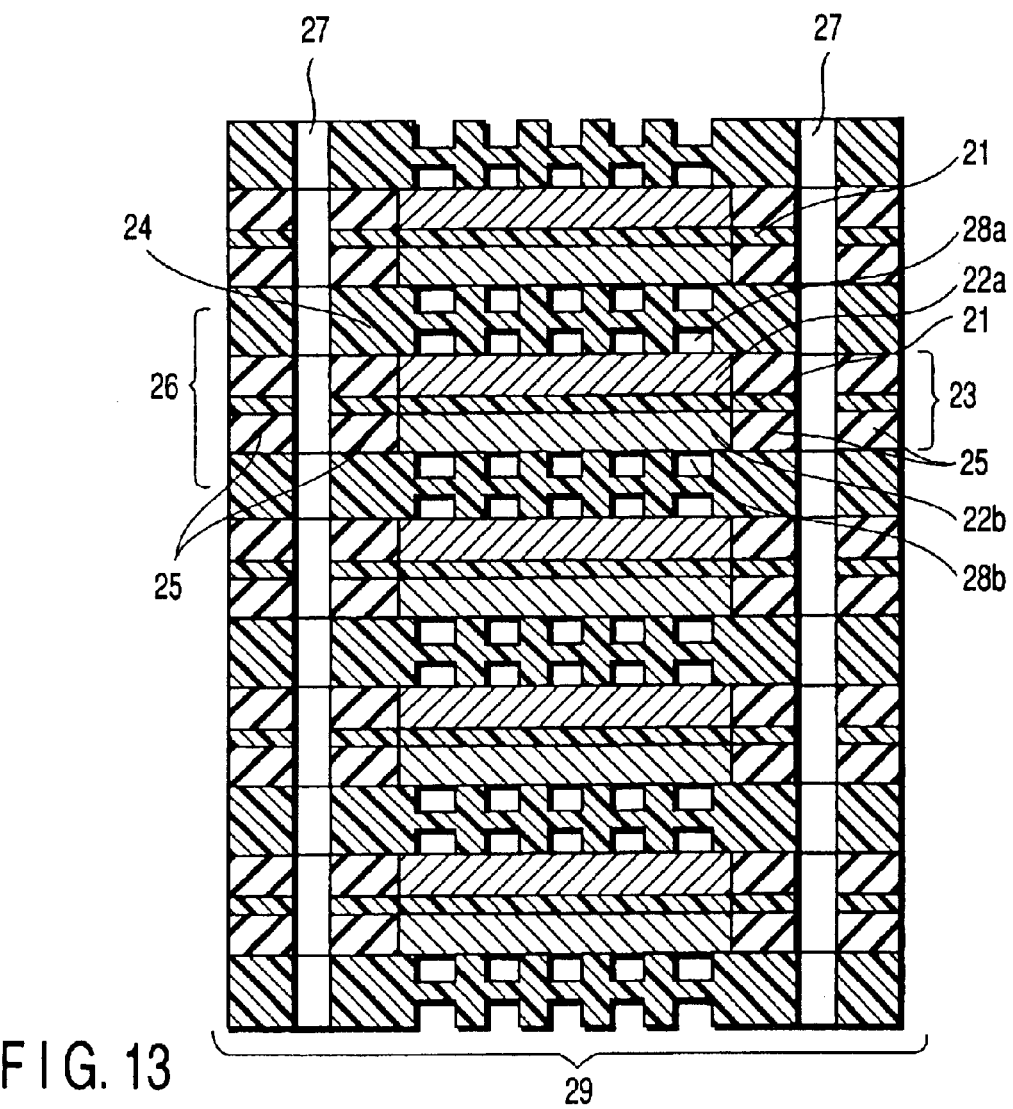
FIG. 13 is a cross-sectional diagram showing a conventional solid polymer fuel cell stack.

An enlarged cross sectional view of the separator 7 used in the fuel cell H is shown in FIG. 11. Unlike the separator whose enlarged cross section is shown in FIG. 2, since the expansion graphite layer 13 having a basis weight of 500 g/m$^2$ has poor moldability, the thickness of the expansion graphite layer 13 over the pits and projections at the time of molding the separator 7 is not uniform, and the thickness over the projection is larger than that over the pit. That is, the density of the expansion graphite layer 13 over the projection becomes lower. Thus, compression creep increased, so that the pressure loss of the oxidant gas increased with time. The increase in the pressure loss was observed in the first 60 hours or so. Thereafter, once the compression creep reached saturation, the pressure loss remained constant.

From the result of this test, it was confirmed that an increase in the pressure loss of the reaction gas with time could be suppressed when the expansion graphite layer 13 had a basis weight of 300 g/m$^2$ or less. Thus, the basis weight of the expansion graphite layer 13 is desirably 50 to 300 g/m$^2$.

(Effects)

With an expansion graphite layer having a basis weight of 50 to 300 g/m$^2$, the contact resistance between a separator and a film electrode composite can be sufficiently reduced, good load conformity can also be obtained, and a high-performance, stable solid polymer fuel cell can be obtained without incurring an increase in the pressure loss of a reaction gas which is caused by the compression creep of the separator due to the clamping load.

Further, by providing a solid polymer fuel cell comprising a carbon resin composite material separator in which an electric potential measuring terminal or a temperature measuring probe is incorporated in advance and integrated by press-molding, the occurrence of a short circuit accident caused by detaching of the probe can be prevented, diagnosis of the cell is facilitated, and its safety is improved.

Although a description has heretofore been given to the embodiments in which the present invention is applied to a solid polymer fuel cell as a separator for a fuel cell, it can also be applied to fuel cells other than the solid polymer fuel cell.

The separator for a fuel cell according to the present invention, a production process thereof, and a solid polymer fuel cell using the separator can be applied to fuel cells usable as a variety of power sources such as a power source to be mounted on a vehicle or a stationary power source.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell separator for which has gas channels to feed a fuel gas and an oxidant gas to gas diffusion electrodes of a fuel cell, prevents mixing of the fuel gas and the oxidant gas, and has a function of a current collector, wherein the separator is press-molded together with at least one of an electric potential measuring terminal and a temperature measuring probe, at the time of the press-molding, the carbon resin composite material has pits and projections to form the gas channel formed on at least one surface thereof, and the expansion graphite sheet is formed on the surfaces of the carbon resin composite material including the pits and the projections.

2. A fuel cell separator which has gas channels to feed a fuel gas and an oxidant gas to gas diffusion electrodes of a fuel cell, prevents mixing of the fuel gas and the oxidant gas, and has a function of a current collector, wherein the separator is obtained by press-molding a carbon resin composite material comprising a mixture of a carbonaceous material powder and a thermosetting resin powder, an expansion graphite sheet, and a least one of an electric potential measuring terminal and a temperature measuring probe, at the time of the press-molding, the carbon resin composite material has pits and projections to form the gas channels formed on at least one surface thereof, and the expansion graphite sheet is formed on the surfaces of the carbon resin composite material including the pits and the projections.

3. The separator of claim 2, wherein the carbon resin composite material is a raw material comprising 0 to 85 wt % of the carbonaceous material powder and 15 to 100 wt % of the thermosetting resin powder.

4. The separator of claim 2 or 3, wherein the expansion graphite sheet has a basis weight of 50 to 300 g/m$^2$.

5. A solid polymer fuel cell having a structure in which a film electrode composite having a gas diffusion electrode disposed on both surfaces of a solid polymer film and a separator having gas channels to feed at least one of a fuel gas and an oxidant gas to the gas diffusion electrodes are laminated repeatedly in such a manner that the film electrode composite and the separator contact each other, wherein the separator is obtained by press-molding a carbon resin composite material comprising a mixture of a carbonaceous material powder and a thermosetting resin powder, an expansion graphite sheet, and at least one an electric potential measuring terminal and a temperature measuring probe, the carbon resin composite material has pits and projections to form the gas channels formed on at least one surface thereof, and the expansion graphite sheet is formed on the surfaces of the carbon resin composite material including the pits and the projections.

6. The cell of claim 5, wherein a raw material comprising a mixture of 0 to 85 wt % of the carbonaceous material and 15 to 100 wt % of the thermosetting resin is used as the carbon resin composite material.

7. The cell of claim 5 or 6, wherein the expansion graphite sheet has a basis weight of 50 to 300 g/m$^2$.

* * * * *

UNITED STATES PATENT AND TRADEMARK OFFICE
CERTIFICATE OF CORRECTION

PATENT NO.    : 6,797,424 B2                                              Page 1 of 1
DATED         : September 28, 2004
INVENTOR(S)   : Ooma et al.

It is certified that error appears in the above-identified patent and that said Letters Patent is hereby corrected as shown below:

<u>Title page,</u>
Item [63], Related U.S. Application Data, should read:

-- Related U.S. Application Data

[63] Continuation of application No. PCT/JP01/08593, filed on Sep. 28, 2001. --

Signed and Sealed this

Seventh Day of December, 2004

JON W. DUDAS
*Director of the United States Patent and Trademark Office*